(12) United States Patent
Lee

(10) Patent No.: US 10,120,460 B2
(45) Date of Patent: Nov. 6, 2018

(54) HIGH RESOLUTION AND HIGH SENSITIVITY OPTICALLY ACTIVATED MOTION DETECTION DEVICE USING MULTIPLE COLOR LIGHT SOURCES

(71) Applicant: Wen-Chieh Geoffrey Lee, Taipei (TW)

(72) Inventor: Wen-Chieh Geoffrey Lee, Taipei (TW)

( * ) Notice: Subject to any disclaimer, the term of this patent is extended or adjusted under 35 U.S.C. 154(b) by 109 days.

(21) Appl. No.: 13/834,085

(22) Filed: Mar. 15, 2013

(65) Prior Publication Data

US 2013/0241835 A1 Sep. 19, 2013

Related U.S. Application Data

(60) Provisional application No. 61/611,116, filed on Mar. 15, 2012.

(51) Int. Cl.
| | | |
|---|---|---|
| G06F 3/033 | (2013.01) | |
| G06F 3/0354 | (2013.01) | |
| G06F 3/03 | (2006.01) | |

(52) U.S. Cl.
CPC ............ *G06F 3/033* (2013.01); *G06F 3/0317* (2013.01); *G06F 3/03543* (2013.01)

(58) Field of Classification Search
None
See application file for complete search history.

(56) References Cited

U.S. PATENT DOCUMENTS

| | | |
|---|---|---|
| 5,825,945 A | 10/1998 | Stolis et al. |
| 6,392,632 B1 | 5/2002 | Lee |
| 6,697,053 B2 | 2/2004 | Kajihara |
| 7,019,733 B2 | 3/2006 | Koay |
| 7,081,612 B1 | 7/2006 | Lu |
| 7,301,531 B2 | 11/2007 | Wu |
| 7,355,160 B2 | 4/2008 | Cheah et al. |
| 7,439,954 B2 | 10/2008 | Theytaz et al. |
| 7,656,395 B2 | 2/2010 | Pope et al. |

(Continued)

FOREIGN PATENT DOCUMENTS

WO  WO 2011/028620  3/2011

OTHER PUBLICATIONS

"Review of CMOS image sensor," by M. Bigas, et al., Microelectronics Journal 37, Sep. 6, 2005, pp. 433-451, www.elsevier.com/locate/mejo.

(Continued)

*Primary Examiner* — Claire X Pappas
*Assistant Examiner* — Benjamin Casarez
(74) *Attorney, Agent, or Firm* — Saile Ackerman LLC; Stephen B. Ackerman

(57) ABSTRACT

An optical computer mouse senses movement by detecting the variations in intensity of reflected primary colors from a surface over which the mouse is moved. The surface is illuminated by a plurality of colors of light. An image sensor is formed from an array of photodiodes covered with a color filter array that matches the primary colors of the lights and is used to detect intensity of reflected light of the primary colors from the surface on which the optical computer mouse rests. Variations in the intensity of at least one of the primary colors of reflected light are used to determine movement by the computer mouse. Both the intensity of the individual lights and sensitivity of the array of photo diodes are controlled by a controller.

19 Claims, 12 Drawing Sheets

(56) References Cited

U.S. PATENT DOCUMENTS

| | | | |
|---|---|---|---|
| 7,872,639 B2 | 1/2011 | Theytaz et al. | |
| 7,924,266 B2 | 4/2011 | Larsen | |
| 2002/0070919 A1* | 6/2002 | Kajihara | 345/166 |
| 2003/0058358 A1* | 3/2003 | Arima | 348/301 |
| 2004/0046737 A1* | 3/2004 | Numazaki et al. | 345/156 |
| 2005/0024336 A1 | 2/2005 | Xie et al. | |
| 2005/0024623 A1 | 2/2005 | Xie et al. | |
| 2005/0094154 A1* | 5/2005 | Baney et al. | 356/499 |
| 2005/0219215 A1* | 10/2005 | Wu | G06F 3/0317 345/166 |
| 2005/0231482 A1* | 10/2005 | Theytaz | G06F 3/03543 345/166 |
| 2006/0132443 A1 | 6/2006 | Chien Wu | |
| 2006/0262094 A1* | 11/2006 | Chang | G06F 3/0317 345/166 |
| 2007/0215792 A1* | 9/2007 | Cheah | G06F 3/0317 250/221 |
| 2007/0216704 A1* | 9/2007 | Roberts et al. | 345/597 |
| 2007/0285535 A1* | 12/2007 | McGillvray et al. | 348/246 |
| 2007/0287218 A1* | 12/2007 | Smith | 438/78 |
| 2009/0046903 A1* | 2/2009 | Corcoran et al. | 382/124 |
| 2009/0102793 A1 | 4/2009 | Bohn et al. | |
| 2009/0121641 A1* | 5/2009 | Shih | 315/157 |
| 2009/0146044 A1* | 6/2009 | Chen et al. | 250/201.1 |
| 2009/0146982 A1* | 6/2009 | Thielman et al. | 345/207 |
| 2009/0153486 A1 | 6/2009 | Bohn | |
| 2009/0160772 A1 | 6/2009 | DePue et al. | |
| 2010/0073294 A1* | 3/2010 | Kim et al. | 345/166 |
| 2010/0182294 A1* | 7/2010 | Roshan et al. | 345/207 |
| 2011/0074683 A1* | 3/2011 | Bilbrey et al. | 345/166 |
| 2011/0085708 A1* | 4/2011 | Martin et al. | 382/115 |
| 2011/0235855 A1* | 9/2011 | Smith | 382/103 |
| 2012/0194692 A1* | 8/2012 | Mers et al. | 348/222.1 |
| 2013/0002555 A1 | 1/2013 | Lee | |
| 2013/0084917 A1* | 4/2013 | Combs et al. | 455/556.1 |
| 2013/0234029 A1* | 9/2013 | Bikumandla | 250/349 |
| 2018/0143700 A1* | 5/2018 | Lee | G06F 3/0317 |

OTHER PUBLICATIONS

"CMOS Image Sensor for High Speed Applications," by Munir El-Desouki, et al., Sensors, Jan. 13, 2009, pp. 430-444, doi: 10.3390/s90100430, www.mdpi.com/journal/sensors, ISSN 1424-8220.

"TwistMouse for Simultaneous Translation and Rotation," by Jacqui Hannagan, A dissertation submitted for the partial fultulment of the requirements for the degree of Bachelor of Commerce (Honours), at the University of Otago, Dunedin, New Zealand, Nov. 14, 2007, pp. 1-117.

Co-pending, U.S. Appl. No. 13/743,582, filed Jan. 17, 2013, "High Resolution and High Sensitivity Optically Activated Touch Sensing Device Using Multiple Color Light Sources," by Wen-Chieh Geoffrey Lee.

Optics, Fourth Edition, (International Edition), by Eugene Hecht, Copyright 2002 Pearson Education Inc., CA, Ch. 4, pp. 132-133, Geoffrey Lee Reference Materials, Nuora Corp. Jun. 5, 2013.

"About BlueTrack Technology," Bluetrack Technology in a Computer Mouse/Microsoft Hardware, pp. 1-3, found: http://www.microsoft.com/hardware/en-us/bluetrack-technology, Sep. 14, 2011.

"Metamerism (color)," from Wikipedia, the free encyclopedia, pp. 1-4, found: http://en.wikipedia.org/wiki/Metamerism_(color), on Jan. 25, 2013.

European Search Report, Application No. 13 368 011.6-1959, Applicant: Wen-Chieh, Geoffrey Lee, dated Nov. 8, 2016, 7 pgs.

"Xerox PARC Develops Hyperspectral Imager," by Vladimir Koifman, Image Sensors World, Oct. 27, 2015, 4 pgs., http://image-sensors-world.blogspot.tw/2015/10/xerox-parc-develops-hyperspectral-imager.html.

"Hyperspectral imaging with a liquid crystal polarization interferometer," by Alex Hegyi et al., Copyright 2015 Optical Society of America, 13 pgs., Optics Express vol. 23, Issue 22, pp. 28742-28754 (2015), Received: Jul. 22, 2015, https://doi.org/10.1364/OE.23.028742.

* cited by examiner

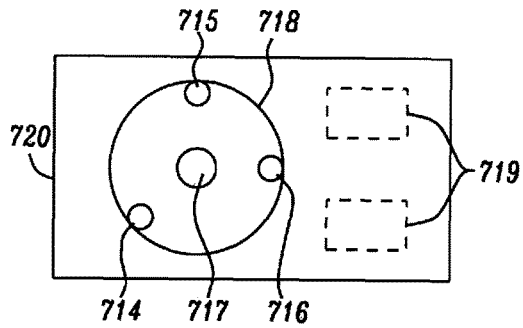
FIG. 7A
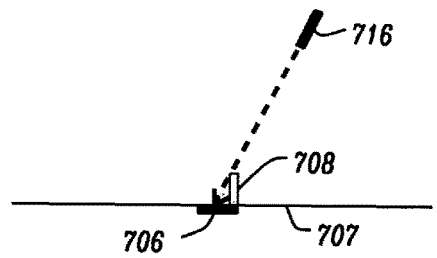
FIG. 7B
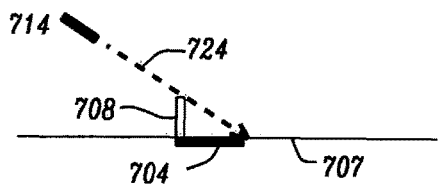
FIG. 7C
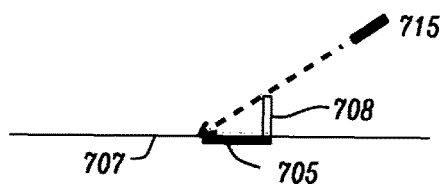
FIG. 7D
| R | G | R | G | R | G | R | G |
|---|---|---|---|---|---|---|---|
| G | B | G | B | G | B | G | B |
| R | G | R | G | R | G | R | G |
| G | B | G | B | G | B | R | B |
| R | G | R | G | R | G | R | G |
| G | B | G | B | G | B | G | B |
FIG. 8

HIGH RESOLUTION AND HIGH SENSITIVITY OPTICALLY ACTIVATED MOTION DETECTION DEVICE USING MULTIPLE COLOR LIGHT SOURCES

This application claims benefit to U.S. Provisional Patent Application 61/611,116, filed on Mar. 15, 2012, which is herein incorporated by reference in its entirety.

RELATED PATENT APPLICATION

This application is related to patent application Ser. No. 13/482,086, filed on May 29, 2012, which is herein incorporated by reference in its entirety.

1. TECHNICAL FIELD

The present disclosure relates to a motion detection device, and in particular to an optically activated cursor maneuvering device that moves on a two dimensional plane, e.g. a mouse pad or desktop surface, and maneuvers the cursors in either two dimensional or three dimensional displaying devices.

2. BACKGROUND

Today various kinds of electronic systems such as industrial computers, work stations, desktop computers, laptop computers, cell phones etc. rely on a decades old device, an optical mouse, to sense the movement of the operator's hand (or finger, or something of equivalent function), and translate that movement into instruction(s) or motion vector(s) of the cursor(s) in the display of the electronic system. Inside each optical mouse lies an image sensor to capture series of images and compare them at a high frame rate. There are several factors affecting the performance of the image sensor, e.g. photodiode size (i.e. pixel size), resolution (e.g. pixels/inch), frame rate, lens quality, the intensity or incident angle of the illuminating light, etc. In the optical mouse industry, resolution is defined by the number of pixels that the image sensor and lens can view per inch while the mouse is being moved. If the resolution is high, then the operator would require less mouse movement to get accurate motion vector data, and this in turn will relax the requirement for higher frame rate, which eventually lowers the power consumption of the optical mouse. Today most of the mice run at frame rate of thousands per second, and at a resolution of 700-800 pixels per inch. Gaming mice have a higher resolution (e.g. thousands of pixels per inch) as compared to that of normal mice for a smoother and more accurate operation. The above specifications are satisfactory for most household users where the desktop surface is a wood plate, but when the optical mouse is facing a very smooth surface (e.g. a glossy plate), it becomes clumsy, slow, and often leads to unstable results. Therefore, a lot of power is wasted due to many of calculations, which only provide erroneous results.

FIG. 1 shows a conventional optical mouse 102 having a select button 101 and an USB cable 105 to connect to a computer. A monochromatic light source 103 is mounted in the cavity 106. By reflection, light from light source 103 impinging onto the targeted desktop surface 107 is captured by the image sensor 104.

FIG. 2 shows an exemplary case of how a particle on a surface under an optical computer mouse is seen by the image sensor 104. The particle surface is largely represented by pixels 201, 204, 205, etc. The particle edge is largely represented by pixel 202. It is to be noted that the difference in pixel values (i.e. the gray level) between pixel 201 and pixel 205 is usually smaller than that of pixels 202 and 203. Thus, for the best result of pattern recognition, it is desired to recognize the boundary, sharp tip, etc. by optical means. In order to reach this goal, a previous effort resorted to lighting techniques to make the object (i.e. surface textures, particles) stand out more from the background. The theory is the following: In materials science, the roughness of a surface is often denoted by an Ra value (specifically, roughness Ra is quantified by the arithmetic average of the vertical deviations (i.e. yi) of a real surface from its ideal form, which is expressed mathematically as $$R_a = \frac{1}{n}\sum_1^n |y_i|.$$

Surface roughness has fundamental influence on microscopic images in that it forms microscopic shadows for the tiny objects that stand "extruded" out of the targeted surface plane. When there are distinctive shadows in the image, it is easier for the image sensor to see the objects.

FIG. 3A shows an image taken by a conventional optical mouse that is illuminated by a tilted light (e.g. approximately 45 degree to the targeted object surface). The shadow of the particle is represented as Pixel P1, P2, and P3. Pixel P4 represents the top surface of the object. Note that the contrast between P1, the shadow, and P5, the pixel representing the background, is usually larger than that of top surface of the object, P4. In fact, to the best performance of these types of optical mice, P4 is preferred to have as little variation as possible. In order to reach the goal of having the highest contrast for shadow and the lowest one for the object top surface. A second light source can be a diffused light beam that shines on the pixel plane P4. Since this light beam is preferred to be a diffused one; it is intended to form a "flat" image of the object surface and not used for pattern recognition and background; therefore, the variation in pixel values in the respective areas is very little.

As the above cases illustrate, today's optical mouse uses monochromatic light as a conventional mean to illuminate object, and this technique has lasted for decades. As a consequence seeing a color image has not been a requirement for the conventional optical mouse. Instead, it is the capability of seeing the shadows or textures in the image that is the most important to the performance of the conventional optical mouse.

U.S. Patent Application No. 2009/0160772 A1 (DePue et al.) is directed to an optical mouse with diffused optics, wherein an optical diffuser is configured to diffuse light from the light source that illuminates the tracking surface. Despite that this works well in ordinary situations in the extreme occasions when the surface of the targeted object is very smooth (i.e. Ra is too low), the approach fails in that there just are no or too few shadows available for the optical mouse to see at all.

There are some special designs to drastically increase the brightness of the particles or textures on object surface by enhancing the light intensity by laser light source. There are other approaches that use dark field image to make the background looked dimmed, and there are approaches that use a special angle of incident light to shine on the object surface in hopes that the PSNR is enhanced (PSNR stands for the peak signal to noise ratio). This is not only associated with the surface roughness Ra, but also the spectral response of the object surface. In conventional optical mouse device, the ratio of the intensity of the light beam coming from the targeted objects to that of the background light can be interpreted as the signal to noise ratio of the picture. Alternatively, the mouse industry use a similar meaning factor called the SQUAL, which denotes the surface quality. SQUAL counts the number of features identified by an image frame. If the signal level is increased caused by increasing the light intensity, or the background signal is suppressed by some diffusion means to a flat level with less undulation then the PSNR is increased. So, many of the conventional optical mice endeavor to increase the PSNR by, for example, adjusting the tilting angle of incident light timely, or using multiple light beams, etc. U.S. Pat. No. 7,439,954 B2 (Theytaz et al.) is directed to a multi-light source computer pointing device. U.S. Pat. No. 6,392,632 (Lee) is directed toward an optical cursor controlling device comprising an integrated camera. U.S. Patent Application No. 2005/0024336 (Xie et al.) is directed to the use of a Lambertian surface in a computer mouse to form a spectral reflection, which provides an enhanced contrast to the image for purposes of navigation. U.S. Patent Application No. 2005/0024623 (Xie et al.) is directed to the use of a Lambertian surface and a narrow bandwidth of light in a computer mouse to form a narrow bandwidth spectral reflection. U.S. Pat. No. 5,825,945 (Stolis et al.) is directed to a check imaging device using a Lambertian surface to project a highly uniform and diffused beam to an imaging site.

FIG. 3B demonstrates the drawback in the conventional art, when an optical computer mouse views the contour of an object on a desktop surface. When the targeted desktop surface has a very low surface roughness value or is made of a glossy material, the number of pixels representing the shadows or a unique point is rarified (i.e. P6A and P6B); wherein the total number has been decreased from three to two pixels comparing FIG. 3B to FIG. 3A. Also note that the contrast of the gray level among P6A and P6A (i.e. the shadow). P7 (the background scene), and P8 (the object body) has been decreased drastically. These effects often lead to the erroneous result of motion detection where the gray level denotes the energy density that a pixel receives from light impingement which can be monochromatic or multi-colored, depending on the sensitivity of the respective pixel.

SUMMARY

It is an objective of the present disclosure to provide a high speed, high resolution, sensitive, and low power optical mouse comprising a set of multiple color lighting sources;

It is further an objective of the present disclosure to adjust the light sources of the optical mouse in accordance with colorimetry, wherein a digital image is dissected into several subimages in which each subimage is constituted by elements of one of the primary colors.

It is also an objective of the present disclosure to use at least three different colored lights wherein each of the colored lights is a primary color.

It is also further an object of the present disclosure to use an optoelectronic sensor, for instance an image sensor in which a CFA (color filter array) formed over the individual pixel diodes matches the color of the light sources of the optical mouse.

It is still further an objective of the present disclosure to be able to control the intensity of each colored light independent of the other lights.

In the present disclosure, multiple color lights are used, wherein the spectral energy density of the lights have been recorded, or acknowledged by a program embedded in the light control circuitry of the optical mouse. When the sources of light shine on an object surface, the control circuitry adjusts the intensity of each of the respective sources independent of each other, as well as the characteristic of the light sources (e.g. power density).

The most unique and important part of the disclosed optical mouse is that the control algorithm adopts colorimetry; the term colorimetry as is disclosed by this disclosure has at least the following meaning.

(1) Spectrally different stimuli combine, mathematically or physically, to yield new stimuli that can be used by different devices (e.g. LED, color filter, computer program, optical mouse, electronic displaying device, etc.).

(2) Three primary stimuli form the basis of stimuli in color space, which can be red, blue, and green; other stimuli may be YMC, YUV, etc.

(3) A complete set of all allowable stimuli forms a color gamut.

(4) Colorimetry has to do with the accurate expression of color. It is not a conceptual term. Data generated per colorimetry teaches the engineer how to manipulate the colors for different color rendering devices.

(5) The transformation process from one set of primary stimuli to another is done by the following:

$$\begin{bmatrix} D \\ E \\ F \end{bmatrix} = \begin{bmatrix} D_{A=1,B=0,C=0} & D_{A=0,B=1,C=0} & D_{A=0,B=0,C=1} \\ E_{A=1,B=0,C=0} & E_{A=0,B=1,C=0} & E_{A=0,B=0,C=1} \\ F_{A=1,B=0,C=0} & F_{A=0,B=1,C=0} & F_{A=0,B=0,C=1} \end{bmatrix} \times \begin{bmatrix} A \\ B \\ C \end{bmatrix} \quad \text{EQ (1)}$$

For example, the typical primary stimuli $$\begin{bmatrix} A \\ B \\ C \end{bmatrix}$$

used by today's color CMOS image sensor is R (red), G (green), and B (blue). By transformation, RGB can be transformed in to YUV, Lab, etc. The primary stimuli system used for H.264 video streaming file, adopted by an iPhone (manufactured by Apple, Inc.) and better for motion detection use, is YUV. Thus, it is a common process for today's color image sensors that, prior to doing motion detection, a transformation from the stimuli as received into a different one takes place. Associated technology in this field is often referred as color management. As can be noticed easily, color management is done based on colorimetry, which has to do with the accurate expressing of colors.

Based on colorimetry, the controlling circuitry of the present disclosure knows that when one primary color in the captured image changes its power intensity, the spectral performance of the other primary colors as seen by the image sensor do not change. Thus, the disclosed optical mouse only has to adjust the power density of the light source associated with one primary color at one time, which will not change the result of the other primary colors. Therefore, the method is robust and comprehensive in enhancing the resolution and sensitivity of the optical mouse on all kinds of surfaces.

Transforming one stimuli system to another is practiced by many of the digital cameras where certain stimuli system can be more sensitive than others in specific applications (e.g. video format YUV 4:2:2 is more sensitive to brightness, video format YMC is more addressable to yellow color, etc). It should be noted that under the optical mouse, the small cavity being faced by the image sensor is literally a dark room, various kinds of optical effects such as light absorption, transmission, Lambertian diffusion, florescence, scintillating, etc. may happen. These effects may not be easily observed in the daylight environment, but when that dark room is placed on a carpet, granite, wood, nylon, etc, they may become the source of artifacts not addressable by the conventional optical mouse.

In optical science, three primary colors suffice to represent the whole color gamut. Using more primary colors than three is acceptable, but for the clarity of explanation, the present disclosure uses only three primary colors in the embodiments. This means that the present disclosure is able to adjust the apparent color of the object in a continuous mode. Mathematically, there is always a middle gray value between two gray level values, thus the color tone can be adjusted continuously. The second advantage is that the apparent color of the object can be adjusted by the illuminating light sources over a wide range (i.e. the entire color gamut), and this allows the disclosed optical mouse to work almost on any kind of surface, so long as that surface can reflect the incident light by a satisfactory amount.

The process associated with colored light control is very simple, rapid, power economical, and efficient in directing motion, since it does not have to worry about picture quality. What the control circuitry cares for is not PSNR (peak signal to noise ratio), but instead, the dynamic range of a subimage and the effectiveness of pattern recognition. A subimage is a view of an object only populated with one of the prime colors used in the computer mouse of the present disclosure. In the case of three prime colors there will be three subimages, one for each color.

An enhanced dynamic range of the subimages allows for the disclosed optical mouse to find patterns at high sensitivity and high resolution, and in turn makes the disclosed device outpace the conventional monochrome optical mouse by higher sensitivity and resolution. Likewise, when an illumination system is set in a way that is favorable to pattern recognition (e.g. less smearing effect on the contour), the overall performance of the motion detection device is enhanced.

The most prominent feature of the disclosed optical mouse lies in the collaboration between its image sensor and the controlling circuitry, which uses the data provided by the image sensor to adjust the lighting condition of the multiple light sources, where the disclosed color management methods (i.e. the embodiments of the present disclosure) are derived based on colorimetry, which are intended to address the complicated problems that arise from the fundamental physics (e.g. diffusion, absorption, florescent, etc.) without knowing, for example, how a granite desktop surface interacts with an LED light. With this key feature, the disclosed optical mouse is able to capture the delicate change on the object surface (i.e. color) without resorting to surface roughness or edges of the objects. The present disclosure outpaces the state of the art in which there has not created any effective mean to adjust the illuminating condition judiciously, and rapidly. The human eye can perceive millions of colors, and the objects surrounding us are often rendering a mixture of multiple colors (e.g. the color of a desktop plate made of poplar is a mixture of red and yellow colors). Without a clear rule as how the multi color lights are to be adjusted, those approaches using multiple color may find little application in the real market. For example, the color of a desktop surface can be a poplar, mahogany, etc., represent different combination of red and yellow color, and in this case when illuminated by the daylight, or a D65 CIE standard light source, the poplar surface would have little color ingredient in blue. Whenever facing such a situation, existing technology that claims to use multi-color light in an optical mouse fail in that they cannot point in any direction to enhance the resolution and sensitivity of the optical mouse by the multiple light sources.

BRIEF DESCRIPTION OF THE DRAWINGS

This disclosure will be described with reference to the accompanying drawings, wherein:

FIGS. 6 A, B, C, and D depict an exemplary process of dissecting a main pixel image into multiple subimages;

FIGS. 7A, B, C, and D show shadowing resulting from the multiple light sources of the preferred embodiment of the present disclosure;

FIG. 8 depicts an exemplary array of photodiodes whose color sensitivity has been assigned specifically to red, blue, and green light;

DETAILED DESCRIPTION

Figure 1:
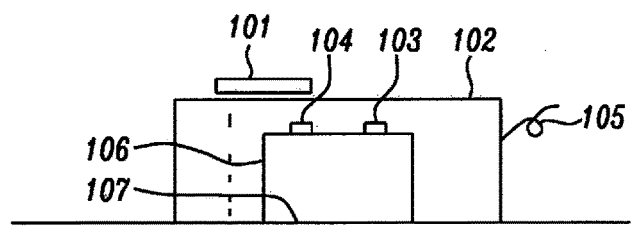
FIG. 1 is a diagram of a conventional optical computer mouse using one light source.
Figure 2:
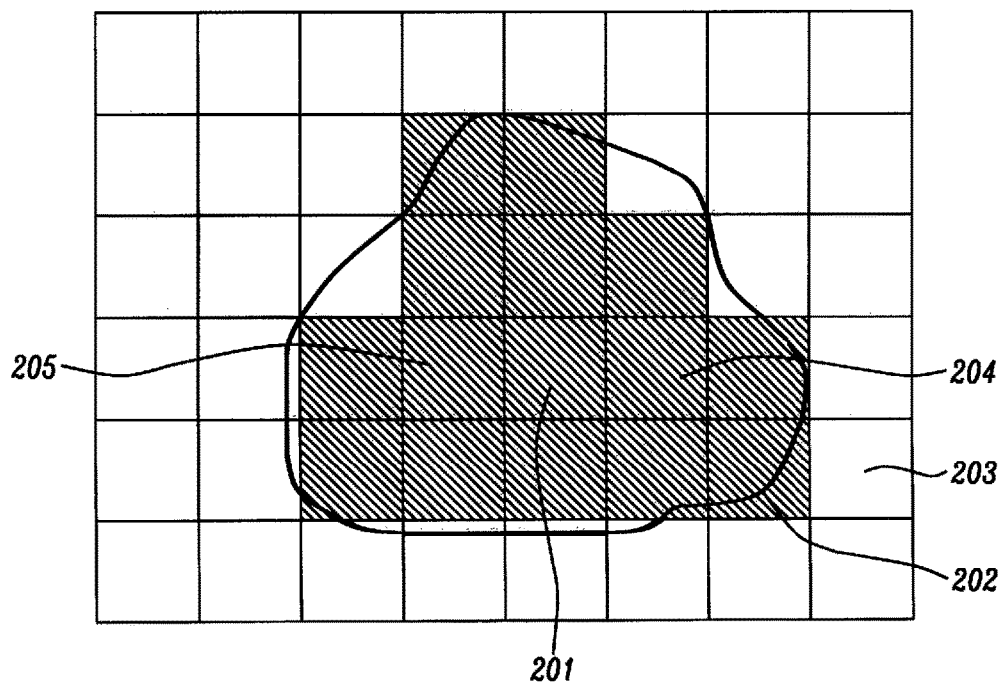
FIG. 2 depicts an exemplary pixel map of an object seen by the conventional the optical computer mouse.
Figure 3A:
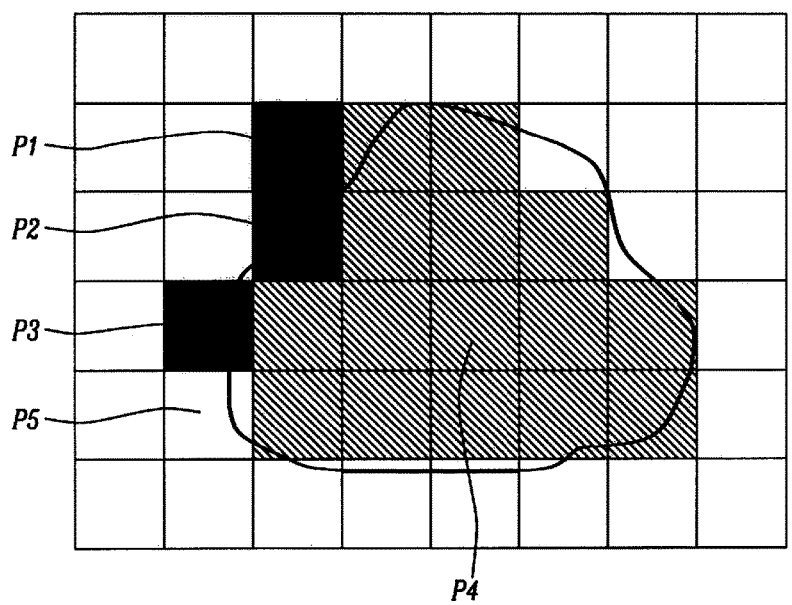
FIG. 3A depicts an exemplary pixel map of an object seen by the conventional optical computer.
Figure 3B:
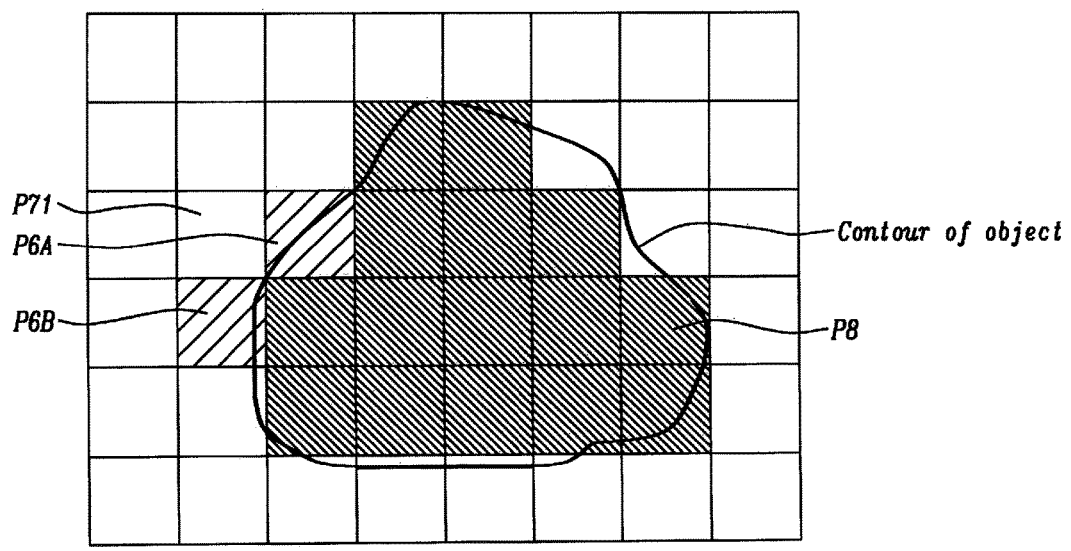
FIG. 3B depicts an exemplary pixel map of an object surface with low surface roughness and shadows with reduced grey levels.
Figure 4A:
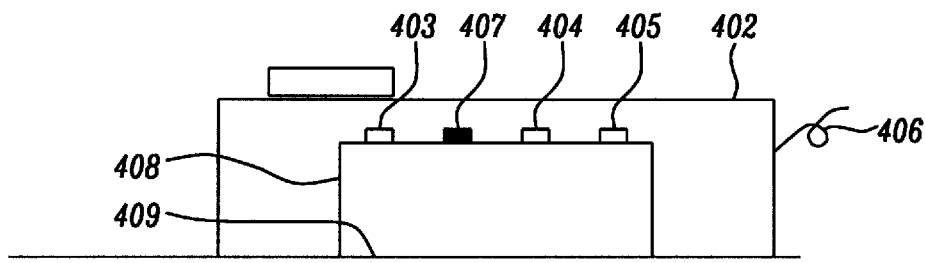
FIG. 4A is a diagram of the optical computer mouse (motion detection device) of the present disclosure using multiple light sources.
Figures 5, 6A, 6B, 6C, 6D:
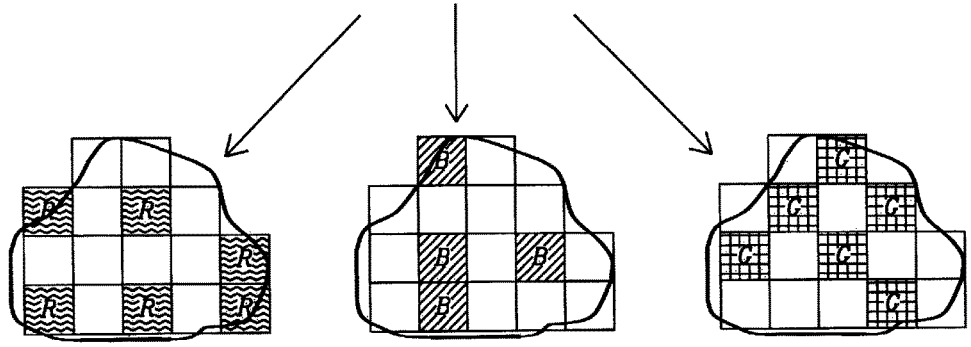
FIG. 5 is an exemplary pixel map of an object activated by multiple light sources and seen by the optical computer mouse (motion detection device) of the present disclosure.

In FIG. 4A is shown an optical electronic device, for example an optical mouse, 402 of the present disclosure, which can be connected by an information carrier 406 to a computer either by wireless means or physical means using a USB cable or equivalent. The optical mouse further comprises a cavity 408 containing a plurality of colored light sources 403, 404, and 405 and an optoelectronic sensor (an image sensor) 407. It should be noted that there should be three light sources as the optimal condition, but more or less light sources can be used (e.g. a white light LED can emit red, green, and blue light beams from a single diode covered by several kinds of dyes). A first light source 403, a second light source 404, and a third light source 405 impinge light onto a targeted desktop surface 409, wherein each light is of a different color. When the light reflected from the targeted desktop surface arrives at the optoelectronic sensor, for example a color image sensor 407, it forms an exemplary image as shown in FIG. 5, which shows a full color picture constituted by three kinds of pixels, red, blue, and green.

Figure 4B:
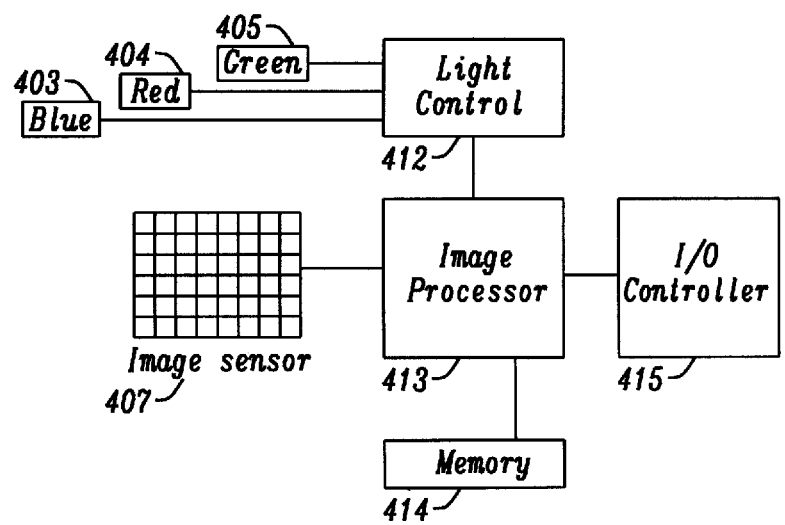
FIG. 4B is the circuit schematic of the optical computer device (motion detection device) of the present disclosure, which is activated by multiple light sources.

In FIG. 4B is shown the circuit diagram of the disclosed optical mouse. A digital image sensor 407 captures an image at a predetermined frame rate. The captured image is dissected into several subimages, e.g. a red subimage, a blue subimage, and a green subimage. The subimages can be either sent to the memory 414 for storage, or to the image processor 413 for motion detection use. The pattern recognition process is done in the image processor 413 at high speed. The I/O controller communicates with the computer to which the optical mouse is attached through the I/O controller 415. An example of separating the captured image, FIG. 6A, into subimages is shown in FIGS. 6B, 6C and 6D, each of which represents a scene captured by a special color scheme, the color red FIG. 6B, the color green FIG. 6D, or the color blue FIG. 6C. When combined together, the "patched" pixel array represents the complete image FIG. 6A of the object, but for motion detection use, this combining process usually is not necessary. When performing motion detection tasks, image processor 413 compares a series of subimages in one color scheme. The image processor 413 does not compare one subimage FIG. 6B to another that has a different color scheme FIG. 6C, unless there is any special purpose not addressed by the present disclosure.

The disclosed optical cursor maneuvering device may resemble the form factors and geometrical characteristics of the conventional optical mouse (i.e. case, camera, cavity, and light source, etc), but as FIG. 4A shows, there is a cavity 408, that contains a plurality of colored light sources 403, 404, and 405 formed from, for example, LED (light emitting diode) devices each of which emits a light with a wavelength span different from that of the others LED devices. Inside the cavity 408 is mounted an image sensor 407 that is able to detect color images, the cavity 408 can be formed into different shapes, e.g. square, rectangular, circular, oval, or an irregular one. The plurality of light sources are preferred to be positioned at a maximum separation in the cavity 408, and the image sensor 407 is preferred to be positioned on the base of the cavity 408 amongst the plurality of colored lights 403, 404, and 405 in such a way as to allow the image sensor 407 to capture the image of the object illuminated by all light sources as evenly as possible.

It should be noted that although the plurality of light sources is preferably LED devices, there are other light sources (e.g. laser device, etc) that can be used. It should also to be noted that the image sensor 407 is preferably, but not limited to, a CMOS imaging sensor capable of capturing color images and dissecting the images captured into multiple subimages, each of which is characterized by a primary color, e.g. red, blue, or green. Note also that the primary color is not limited to red, blue, and green. For example, the primary color set can be yellow, magenta, and cyan, or other colors as well. The lighting condition of the light sources 403, 404, 405 is controlled by a light control circuit 412, which adjusts the output power of the light sources based on the feedback from the image processor 413 in a timely fashion.

FIG. 8 shows how the photodiodes of image sensor are designated to different primary colors. This is often referred by people familiar with the art as the Bayer structure. There are other ways of designating the color sensitivity of each photodiode, and each may have its own purpose (e.g. Honeycomb type color filter array, etc.). For the clarity of explanation in our disclosure, the Bayer structure is used. Other ways of adjusting the color sensitivity of photodiode is applicable to this disclosure since the same method to adjust the lighting condition can be used. In concurrent digital image sensor industry, the task of assigning the photodiode to different color is mostly done by placing a color filter array (CFA) over the image sensor. There are other alternative ways of designating the color sensing capability to the photodiodes (e.g. using ion implantation or even band gap engineering to adjust the internal quantum efficiency of the photodiode, etc.), but using CFA is by far the most popular mean in today's digital image sensor industry. The typical method of assigning the primary colors (i.e. Red, Green, and Blue) to the pixel frame is referred as the Bayer structure. According to Bayer structure, within any area composing of four photodiodes as a rectangle (or square), two photodiodes are to be assigned to green light, one photodiode to the red light, and one photodiode to the blue light. There are many alternative ways to arrange the photodiodes.

Figures 9A, 9B, 9C, 9D:
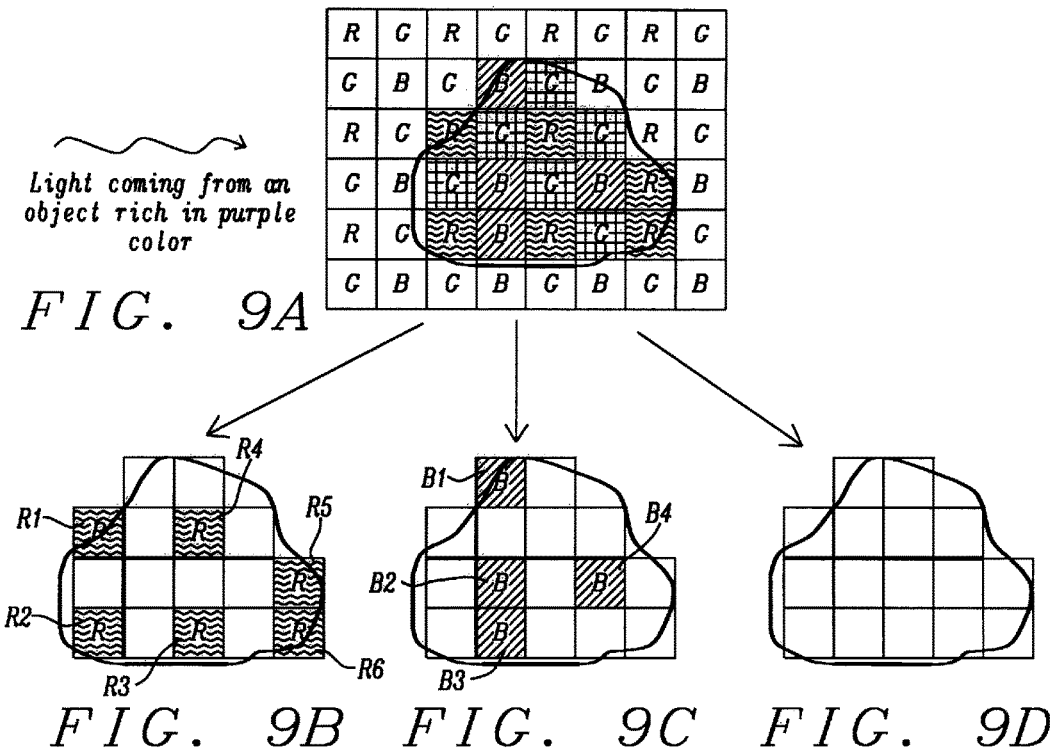
FIGS. 9A, B, C, and D depict an exemplary case of an object having strong spectral response to red and blue light but no response to green light.

FIG. 9A shows an exemplary situation that the present disclosed optical mouse sees an object in purple color. In this case, the red subimage (FIG. 9B) and blue subimage (FIG. 9C) have higher signal values (i.e. the grey level of the respective photodiode) than the green subimage (FIG. 9D) does. Referring back to FIG. 4B, for saving power, the light control circuit 412 of the optical mouse may reduce or even turn off the green light source 405 for the object in purple color. The image processor 413 will acknowledge this, and not pick the green subimage (FIG. 9D) for motion detection use. It should be noted that FIG. 9A only presents the pixel array. The intensity of color light impinging on the each pixel may vary, and they are represented by the grey level of R1 through R6, B1 through B4, as is shown in FIGS. 9B and 9C. For best pattern recognition result, it is desired to have the largest difference among R1 and R6, or among B1 and B4. The ability to pick out an image that is only associated with a specific spectral performance of the targeted surface (e.g. reflectance, florescent, etc.) is an advantage over existing technology since existing technology only uses monochromatic light.

When performing pattern recognition task, the optical mouse of the present disclosure may compare the red subimages or the blue subimages, or both but is usually not necessary. While the optical mouse is moving on the desktop, the gray level of the red subimage (FIG. 9B) and that of the blue subimage (FIG. 9C) may change due to the spectral response such as the reflectivity to one color of light of the desktop surface, which varies from place to place. If the gray level of the red image goes too low, then the controlling circuitry will increase the intensity of the red light, and, according the physics of light, such an act as only increasing the intensity of red light will not lead to any change, or just a negligible amount of change on the blue subimages. Thus, while the disclosed optical mouse is moving, the controller circuit can quickly adjust the power sent to the red light source. As for the blue subimage, it can be left unused, or be investigated as a backup reference, which at certain times is required by the image processor. The same process can be done on the blue light source leaving the red light source as the backup. Therefore, the disclosed optical mouse may come to an optimized setting for the output power of the respective light sources based on the spectral performance (e.g. reflectance, florescent, etc.) of the desktop surface, and this optimized setting can be changed at high speed. As another example, whenever facing a desktop surface that has a "piebald" or an assorted structure characteristic, the disclosed optical mouse can accommodate itself to a few preset values, depending on where the optical mouse is placed, and the knowledge of how to fine tune the illuminating condition in an efficient and rapid manner.

The following explains how the light source control circuit 412 recognizes/adjusts the intensity of light, and explains how the signals in primary colors are measured. In optical physics, Equations EQ. 2 through EQ. 5 can be used to calculate the spectral power density of the light detected by an image sensor, wherein:

$$X = k_\lambda \Sigma S_\lambda R_\lambda \overline{x_\lambda} \Delta \lambda \quad (EQ2)$$

$$Y = k_\lambda \Sigma S_\lambda R_\lambda \overline{y_\lambda} \Delta \lambda \quad (EQ3)$$

$$Z = k_\lambda \Sigma S_\lambda R_\lambda \overline{z_\lambda} \Delta \lambda \quad (EQ4)$$

$$k = \frac{100}{\sum_\lambda S_\lambda \overline{y_\lambda} \Delta \lambda} \quad (EQ5)$$

X, Y, and Z are color index values (the stimuli) representing the energy density of photons in the resultant spectrum received by the image sensor:

S is the intensity of light emitted by the light sources;
R is the reflectance of light by the object being viewed by the image sensor;
□ is the wavelength of the color light; and
$\overline{x}, \overline{y}, \overline{z}$ are the sensitivities of the image sensor at a specific wavelength □□

In a CMOS image sensor, $\overline{x}, \overline{y}, \overline{z}$ are often related to the color filter design (e.g. Bayer color filter). As EQ 2 through 5 shows, the color index X, Y, and Z, are irrelevant to each other when they are integrated over different ranges of λ. Putting it succinctly, when the present disclosed color optical mouse uses multiple lights with different wavelength spans, the resultant value of X, Y, and Z values are independent to each other. The benefit of such an independence is important since if one increases the intensity of one light source, only one parameter among X, Y, and Z will change. Thus, the disclosed optical mouse is able to dissect an image into three subimages per the primary color system used i.e., red, green, and blue image, or whatever primary colors that are chosen to be used.

EQ.2 through EQ.5 also denotes that based on the same physics, there can be other ways to adjust the sensitivity of the present disclosed device than adjusting the power output of respective light sources. For example, in the optoelectronic industry, the LED devices that emit light in different color may use essentially the same kind of diode covered with different types of dyes to get different apparent colors. Thus, adjustment of the relative intensity of the respective light beams can be accomplished by manipulating the chemical ingredients within the dye. Such a method is in compliance with the general rule taught by EQ 2 through EQ5. As another example, the color sensitivity of the respective pixels in a typical CMOS image sensor is influenced by the generic nature of the color filter materials (e.g. CFA), which are essentially chemical materials that only allow the light beams in specific wavelengths to pass through. By adjusting the generic nature of the respective color filter material, the sensitivity of the presently disclosed device can also be adjusted. The present disclosure teaches a general method to adjust the sensitivity of a cursor maneuvering device using light beams in different colors or wavelengths. There are additional methods that can be derived based on the same design rule provided by the present disclosure.

There are other ways to adjust the sensitivity of a photodiode. For example, in conventional art there is a technique called variable sensitivity photo detector (VSPD). This technique combines two pixel arrays whose data are stored in the inverted manner based on two very similar image frames like two pictures taken by an optical mouse within a small time interval, like ns (nanoseconds), and while the mouse is moving; combining two tone-inverted images that would cancel out most of the chunk body of the object and only leave the edges of the object observable in the resultant image. This technique has been used previously to perform edge detection tasks. What VSPD uses is a monochrome image, which does not exploit the rich information that is provided by means of colored light. Nevertheless, various means provided by previous technology for enhancing the capability of an optical mouse in edge detections, or pattern recognitions, such as VSPD, mask filters, etc., can be adopted by the present disclosure as an affiliating method to further enhance the fundamental performance in performing high sensitivity and high resolution motion detection task using multiple color lights.

Most color filters uses Bayer color filter array. A Bayer CFA is composed of a large number of micron-scaled color filters placed in grids in front of the photodiodes in mosaic manner. Each unit grid is assigned as red, blue, and green color, but not limited by these colors. There are other methods of assignment such as magenta, cyan, and yellow. The present disclosure document uses RGB as an example. As explained prior, in a Bayer CFA, each unit cell is positioned in the grid and surrounded by four other cells, but the frequency distribution of each of the colored lights should have the least amount of overlap (so there is a minimum of color mixing as possible). Attributed to the generic characteristics of the color filter material, a photodiode designated to red color is only sensitive to red colored light, and it is effectively not sensitive to green and blue light. A CMOS image sensor can easily reach a capacity of mega pixels. When an optical mouse adopts a high capacity color image sensor and a CFA, its resolution and sensitivity is greatly enhanced as compared to that of conventional optical mouse. The collaboration between multiple colored light sources and the color image sensor, as shown in EQ. 2 through EQ. 5, offers an advantage that have not been attained previously.

Figure 21:
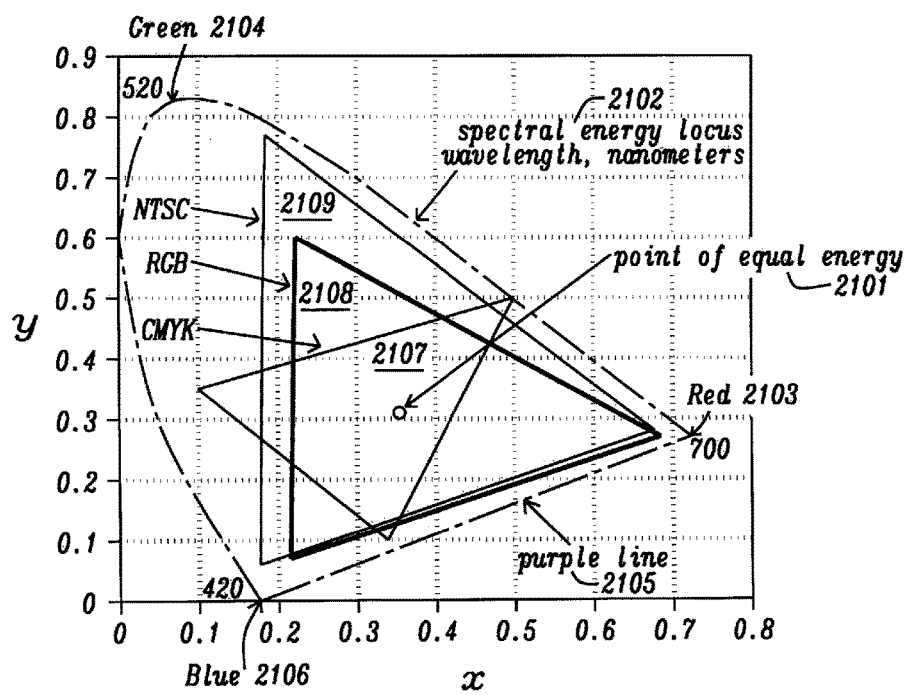
FIG. 21 shows the color gamut used by the disclosed optical mouse.

FIG. 21 shows an exemplary color gamut used by the disclosed optical mouse. The color gamut is formed by a spectral energy locus of wave lengths of light ranging from 420 nm (nanometers) to 520 nm to 700 nm. A line between 420 nm and 700 nm forms a purple line boundary 2105, and the colors blue 2106, green 2104 and red 2103 are located in the gamut region near 420 nm, 520 nm and 700 nm, respectively. On the color gamut there are shown three triangular shaped color regions, each representing a different color models, NTSC (National Television System Committee) 2109, RGB (Red, Green, Blue) 2108 and CMYK (Cyan, Magenta, Yellow and Key (black)) 2107. Within each the color gamut is a point of equal energy 2101 that lies within the triangular shape color regions of the three different color model regions.

According to FIG. 21, the three primary colors, red 2103, green 2104 and blue 2106, are sufficient to represent any point in the color gamut. This means that the disclosed optical mouse is able to adjust the apparent color of the object to any color tone it desires in a continuous mode, and where continuous mode means there is always a middle pixel value between two pixel values. In practice, the disclosed optical mouse would choose a color tone setting, red, blue, and green, as RBG 2108 shows for a specific subimage such that the subimage gives the widest dynamic range or the highest contrast between object and background. For example, for a poplar surface, the disclosed optical mouse may try to increase the intensity of red light or yellow light, or both, so that the dynamic range of the red subimage can be enhanced. The blue subimage of the disclosed optical mouse may suspend the blue image processing work since the reflectance of the poplar surface to blue light is low. This actually makes the combined image frame of the red, green and blue subimages unbalanced to white color. A white color balanced illumination is produced when red, green and blue light is in equal weight, as point 2101 of FIG. 21 shows. However, such an unbalanced image provides unprecedented advantages for motion detection use.

In the present disclosure, the unbalanced illumination system can be adjusted in a timely fashion, so that the disclosed optical mouse also provides another advantage for its high adaptability to environment. This is mainly attributed to the fact that the apparent color of the targeted object can be adjusted by the light sources in a wide range (i.e. theoretically, the entire color gamut). The wide range of apparent color tone allows the disclosed optical mouse to work on any kind of surface, so long as that surface can reflect the incident light by a sufficient amount.

More specifically. FIG. 21 is a general description of the color gamut based on CIE1931, other color gamut may have a similar effect as described by the present disclosure. In FIG. 21, the horizontal axis is x, the vertical axis is y. The relationship among x, y, and z (z is not shown in FIG. 21) is the following.

$$x = \frac{X}{X+Y+Z} \quad (EQ6)$$

$$y = \frac{Y}{X+Y+Z} \quad (EQ7)$$

$$z = 1 - x - y \quad (EQ8)$$

Where: X, Y, and Z are the tri-stimulus values of a color represented by the amounts (i.e. intensities) of three primary colors (e.g. R, G, B).

It should be noted that although the present disclosure is directed to cursor maneuvering, there are other utilities and functions (e.g. motion detection, program activation, etc.) that can be derived from the disclosure herein described that can be adopted by the electronic devices such as cell phones, stationary electronic devices such as desktop computers, etc.

Embodiment 1

FIGS. 7A, B, C and D shows a preferred embodiment of the present disclosure. As FIG. 7A shows, the bottom view of an disclosed optical mouse comprises a cavity 718, inside the cavity 718 lies a color image sensor 717 and three light sources, a first light source 714, a second light source 715, and a third light source 716. The mouse buttons 719 can be placed anywhere on the mouse case 720 that is convenient to the operator.

Figure 10:
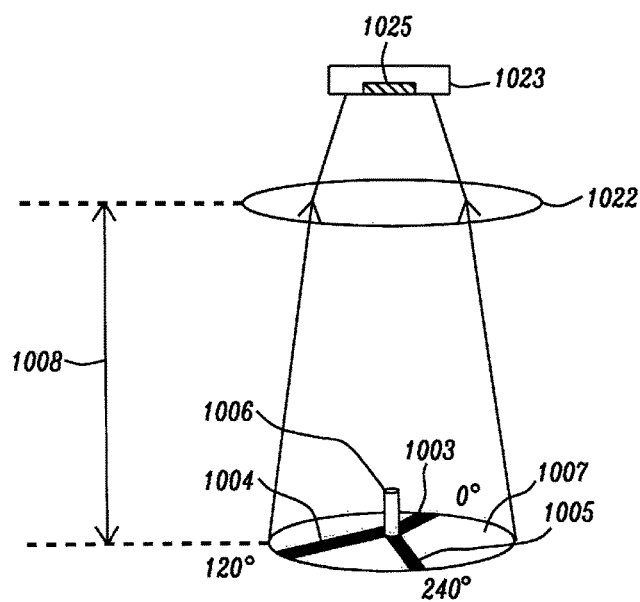
FIG. 10 shows the spatial arrangement of the lens and color image sensor. and depicts a unique phenomenon of multiple shadows.

FIG. 7A shows that at least three color light sources are preferred to be used, which are in different primary colors. In a special arrangement, FIG. 7C shows a first light source 714, which emits a red light, FIG. 7D shows a second light source 715, which emits a blue light, and FIG. 7B shows a third light source 716, which emits green light. The light beam 724 of each of the light sources 714, 715 and 716 cast a shadow 704, 705 and 706 of a surface variation 708 onto the desktop surface 707. The shadows formed on the surface of the desktop 70 are from the colored lights shining at, or across the surface variation 708 comprising an imperfection, defect or a surface particle on the surface of the desktop FIG. 10 shows the spatial arrangement of the lens 1022 and color image sensor 1023, which corresponds to item 717 in FIG. 7. In this preferred embodiment, the color image sensor 1023 is positioned at a vertical distance of a few mm from the targeted desktop surface 1007. The distance 1008 from the targeted object plane surface 1007 to the lens 1022 is typically a few mm to tens of mm. The three light sources 714, 715, and 716, shown in FIG. 7A, are also positioned at a distance of few mm away from the targeted desktop surface 1007 (707 in FIGS. 7B, 7C and 7D). Referring back to FIG. 7A, the three light sources 714, 715 and 716 are preferred to be positioned close to the perimeter of the cavity 718, so that an incident angle between the light beam 724 and the targeted desktop surface 707 of approximately 45 degrees is formed. The three light sources enclose an area having about the same area as that of the cavity 718, and the color image sensor 717 is positioned close to the geometrical center the enclosed area. The benefit of this arrangement is that shadows can easily be taken advantage of.

Almost all surfaces have obtrusive objects lying on them if a magnifying lens is used to see the microscopic world. Obtrusive objects can be dust particles, perturbations, variations or defects in a surface. For example, in FIGS. 7B, 7C and & D there is an object 708 lying obtrusively on the targeted desktop surface 707 that produces shadows 704, 705 and 706 that is attributed to the arrangement of the three light sources 714, 715 and 716, respectively. In fact, shadows and bright spots are interplaying roles in the image. At certain angles, the obtruded object 708 reflects light beams in an intensity that is substantially higher than that of the neighborhood. Together, the shadows and bright spots form an image in high dynamic range. For simplicity, the following discussion uses shadows to explain how this embodiment works, and the same physics should apply to the bright spots (not shown in FIG. 7).

It should be noted that the spatial arrangement of three light sources of present disclosure allows for any object to firm at least one shadow, or one bright spot, on the targeted desktop surface as shown in FIG. 10, wherein an obtrusive object 1006 projects three bar shaped shadows 1003, 1004, and 1005 on the desktop surface 1007, spaced at approximately 0 degrees, 120 degrees, and 240 degrees, respectively, as a result of the location of the colored lights. Attributed to the spatial arrangement of the multiple light sources, an object on the targeted plane surface 1006 will form multiple numbers of shadows 1003, 1004 and 1005, each of which is associated with one light source but not the other light sources. This phenomenon occurs with all objects on the targeted desktop surface 1007, which becomes more obvious when the surface roughness of the desktop surface 1007 is increased.

Figure 11:
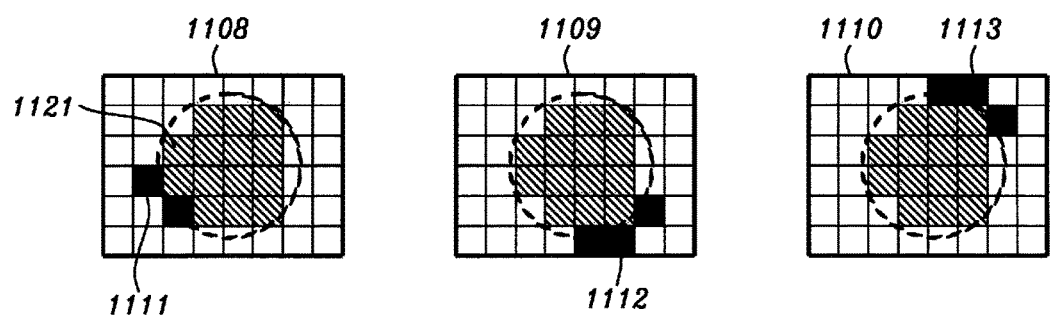
FIG. 11 shows the pixel images of the shadows formed by different color light sources as they appear in different subimages.

As previously mentioned, the three color light sources are in different colors 714, 715, and 716 and the image sensor 717 (1023) is color sensitive. Hence, what is captured by the color image sensor 1023 in FIG. 10 can be represented by FIG. 11; a full color image that can be dissected into three subimages, 1108, which is formed by red pixels, 1109, which is formed by blue pixels, and 1110, which is formed by green pixels. In each mono-color pixel plane, the object body 1006 shown in FIG. 10 is represented by a group of pixels which is labeled 1121, for example. There are three shadows 1111, 1112, and 1113 positioned around the perimeter of the pixels representing the targeted object 1121. It should be noted that in each subimage 1108, 1109 and 1110, there is only one shadow, and each shadow is denoted by a specific color determined by the light source creating the shadow.

Figure 12:
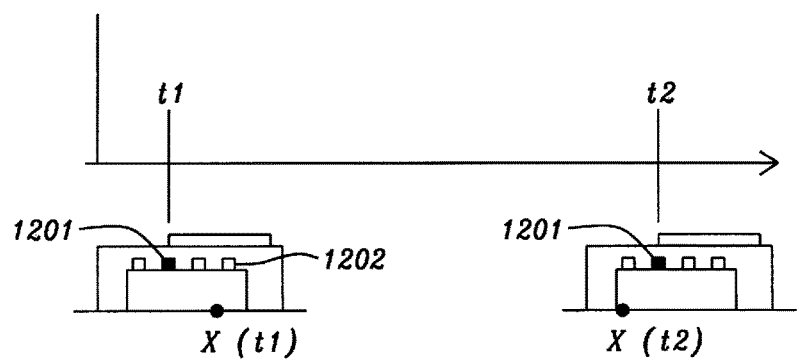
FIG. 12 shows how the relative position between a targeted object and the image sensor changes over two different locations over two different times.

FIG. 12 shows the relative motion of the disclosed optical mouse over a desktop. A point of interest (e.g. an object that can be used by the mouse for motion detection) is that object, which changes position on the image of the image sensor 717 (1023) while the disclosed mouse moves. For example, at time t1, point X is positioned on the right of the color image sensor 1201; after mouse movement, point X is positioned to the left of the color image sensor 1201.

Figure 13:
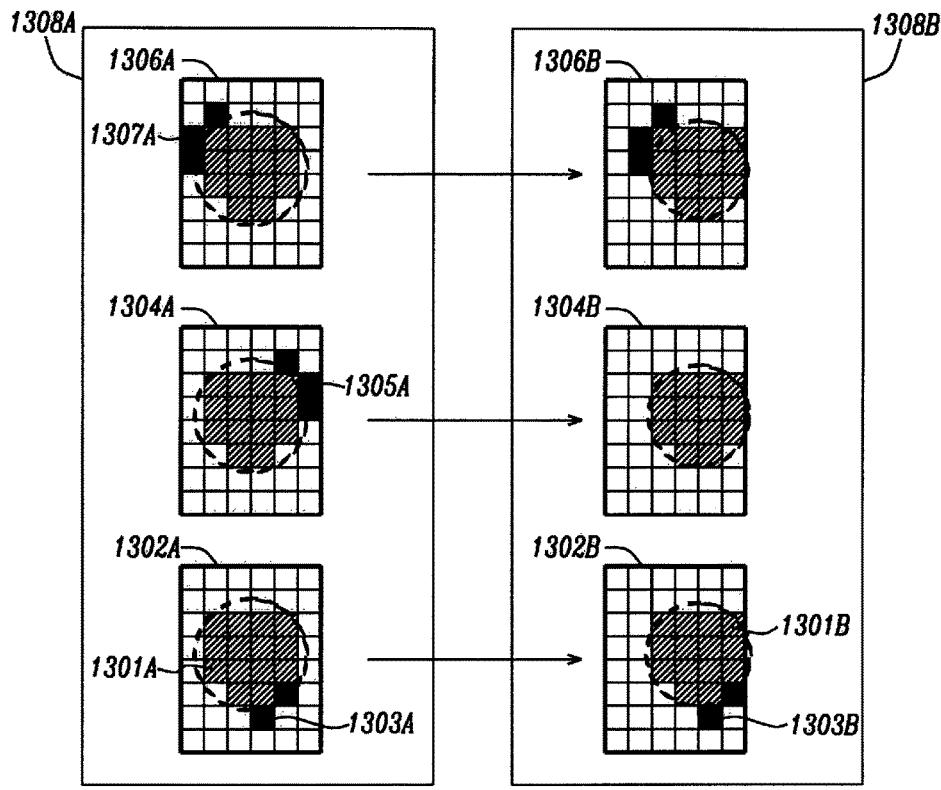
FIG. 13 shows resultant images taken by the color image sensor at two different times.

The image seen by the color image sensor 1201 is shown in FIG. 13. At time t1, a full colored image 1308A is dissected into to three subimages 1302 A, 1304A, and 1306A, and the color tone of the respective subimages is, red, blue, and green. The pixels representing point X, the targeted object, is denoted as item 1301A. When time slips to t2, the image taken at time t2 1308B shows, the pixels representing the targeted object 1301B has been shifted to the right in the subimage 1302B. In this situation, shadow 1303A and shadow 1303B serve the best source for pattern recognition because they form the highest image contrast with the pixels representing the targeted object 1301A and 1301B. However, there are occasions that the shadows are not available. As subimage 1304B shows, the shadow 1305A formerly seen in subimage 1304A disappeared. In this case, the shadow may have moved out of the view of image sensor, but there can be other reasons such as surface morphology change. Thus, relying on one monochromatic source to track motion always faces exceptional situations, as most computer mouse users have experienced. In the example shown in FIG. 13, subimages 1302B and 1306B can be used whenever subimage 1304B is not available for pattern recognition use, wherein the shadow 1307A in subimage 1306A is also visible at time t2 in subimage 13068. Most importantly, subimages 1302B, 1304B, and 1306B do not interfere with each other in that their images are formed by different color light sources, and the respective pixels are not sensitive to the colors that are not in their sensible wavelength span.

Figure 14:
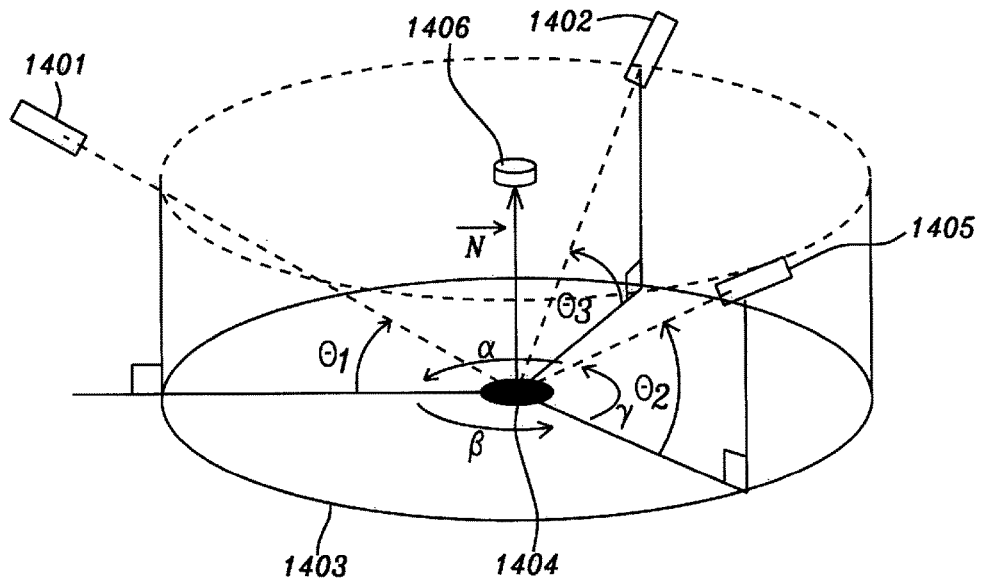
FIG. 14 depicts the geographical relationship among multiple light sources, a color image sensor and the targeted object on a surface plane.

As a reiteration of one the most important advantages acquired by this embodiment, the disclosed device uses multiple light sources, each in different color, as shown in FIG. 14, which depicts the geographical relationship among multiple light sources 1401, 1402, and 1405, color image sensor 1406, and the targeted object surface plane 1403. Light sources 1401, 1402, and 1405 shine light on the focal point of image sensor 1404. The light from each light source is separated by angles □, □, and □ on the targeted object surface plane 1403, where each angle is approximately □□□□. The angle of inclination of the light from the three light sources is approximately □□□□₂□□□□□□□□ Thus □□ the light sources are preferred to be positioned at a lateral distance of approximately a few mm away from the focal point of image sensor 1404, and further it is preferred that these light sources are positioned as far apart from one another as possible. However there are other criteria that could change the value of the inclination of the light beam, the ergonomic design of the optical mouse of the present disclosure.

Embodiment 2

Figure 15:
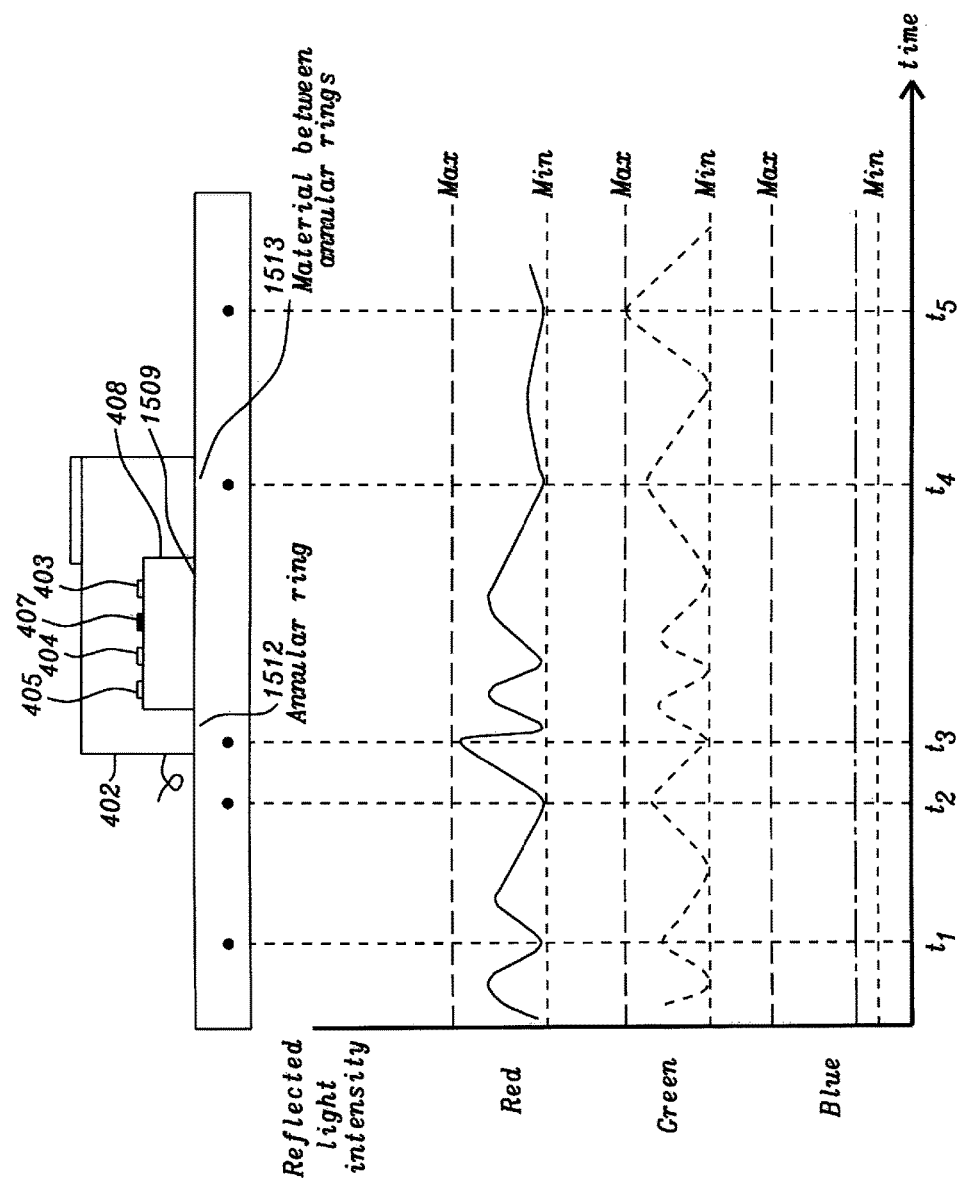
FIG. 15 depicts an exemplary exhibit of how the gray level of each color sensitive photodiode varies when the optical mouse of the present disclosure moves over a multi-colored desktop surface.

The second embodiment deals with a situation deemed by the state of the art as the most challenging, a very smooth, or a glossy desktop surface. FIG. 15 shows an exemplary case where the disclosed optical mouse 402 (detailed previously with respect to FIG. 4) is placed on a very flat surface 1509, such as a wood board painted with a glossy coating such as lacquer. The glossy coating is highly transparent, very flat, and can reflect a lot of light to the image sensor 407, known as smearing, at a certain incident angle, which makes the image processing tasks of the conventional optical mouse difficult. The flat surface 1509 made of lacquer does not provide the surface roughness condition wanted by embodiment 1, but the spectral data of the wood surface acquired by the subimages still can serve as sufficient data sources for motion detection. FIG. 15 shows an example where a poplar wood board 1509 has annular rings 1512 with dark stripes that are brown in color. The rest of the area between the annular rings 1513 is yellowish in color, mixed with some red ingredient therein. While the disclosed optical mouse is moved along the wood surface, the intensity of the red light reflected from targeted desktop surface 1509 to the color image sensor 407 undulates accordingly. This phenomenon happens on both the red and green pixels. Basic optical physics teaches that yellow light can be acquired by mixing red light and green light. Therefore, while the intensity of red color light undulates, the green color light does as well. What needs to be noticed is that the blue color does not change throughout the entire mouse moving action as the resultant data shows in FIG. 15. While the mouse is moving on the targeted desktop surface 1509 and the intensity of three light sources 403, 404, and 405 are kept constant, the intensity of the red light as perceived by the image sensor 407 varies from a maximum to a minimum value from time t1 through t5. The same situation happens on the green reflected light, which varies between a maximum and a minimum in the interval between t1 and t5. The blue light, on the other hand, maintains at a constant level very close to the minimum.

Figure 16:
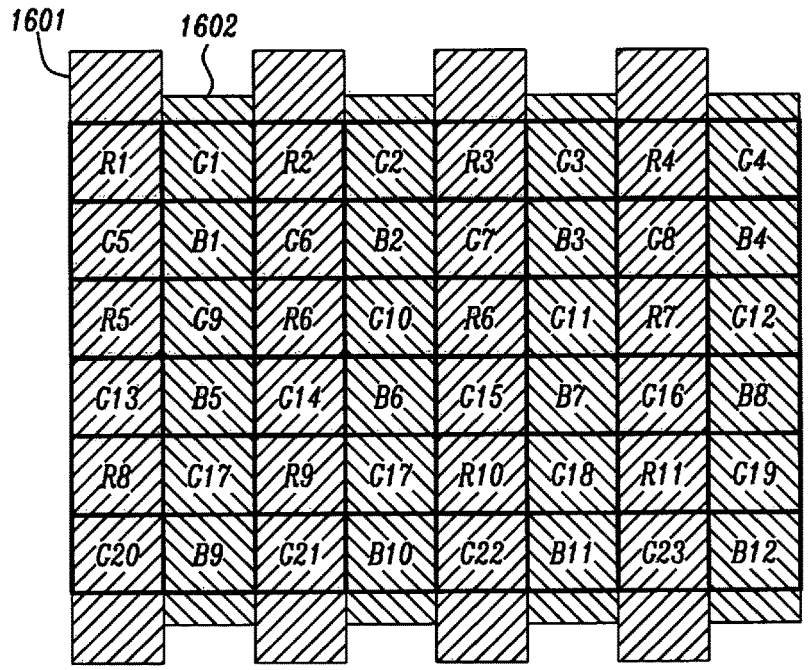
FIG. 16 depicts an envisioned image frame of a wood surface with annular rings captured at time t3.
Figure 17:
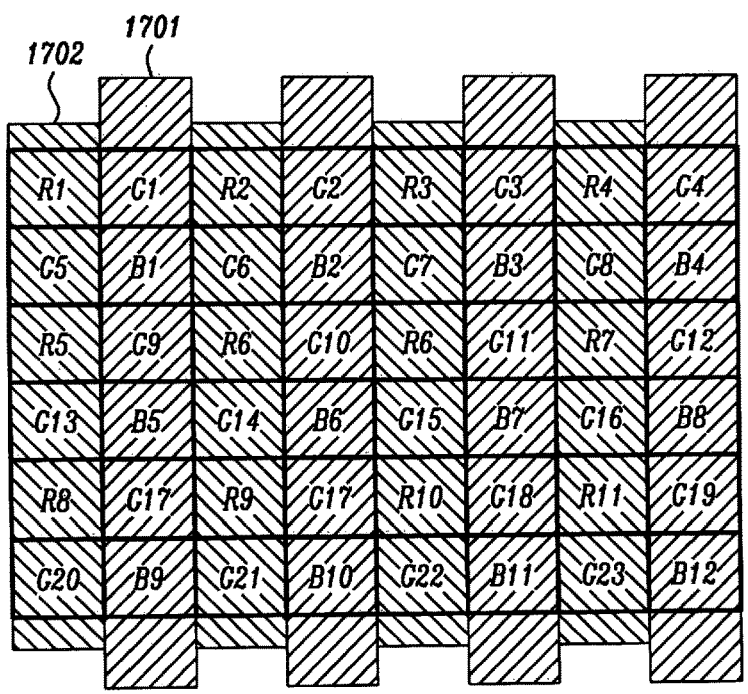
FIG. 17 depicts an envisioned image frame of a wood surface with annular rings captured at time t4.

FIGS. 16 and 17 show a portion of the pixel array of the image sensor 407 at time t3 and then at time t4 and the optical mouse of the present disclosure is moved along the surface of the wood 1509. At time t3, a stripe of brown annular rings is formed on a first column of pixels 1601 (R1-G5-R5-G13-R8-G20); and the yellowish structure between the brown annular rings is formed on a second column 1602 (G1-B1-G9-B5-G17-B9). The situation is reversed at time t4 shown in FIG. 17 where the first column 1702 (R1-G5-R5-G13-R8-G20) now is designated to the yellowish structure of wood surface between the brown annular rings, and the second column 1701 (G1-B1-G9-B5-G17-B9) now is related to the stripe of a brown annular ring. Thus, in a series of subimages of red and green colors, it is seen that the objects are moving, which cannot be done with the conventional art. In the conventional art, a monochromatic light source and a monochromatic image sensor is used. Thus, in a conventional optical mouse, a lumped image sensor would detect the combined intensity of red and green light, which would make the signal level of the conventional art not undulate and in particular with independence between colors. As a consequence, the task of pattern recognition is stampeded. This embodiment of the present disclosure dissects a captured color image into multiple mono-colored subimages. By doing so, the sensitivity and resolution of the disclosed optical mouse surpasses the capability of conventional art.

Embodiment 3

This embodiment deals with a method of controlling illumination with multiple colored light sources with the necessary circuitry. By dimming one light, or enhancing the other, the disclosed circuit not only saves the energy, but also enhances the sensitivity and resolution for motion detection use.

We again start with the illustration of basic physics. It is known that R+G+B=W, where R is red light, G is green light, B is blue light and W is white light. For the optical mouse of the present disclosure, seeking white balance among R, G, and B color is not necessary; however, it is important that at least one subimage of a primary color present a response that varies between a minimum and a maximum as the computer mouse is moved over a surface. In FIG. 15 is shown the response to three primary colors, red, green and blue, where there is a response variation in the red and green primary colors detected by the image sensor 407. Because the color of the surface over which the optical mouse is placed is not of a color containing a blue content, the blue response detected by the image sensor 407 is a constant and at or close to the minimum level for blue reflected light intensity. As previously discussed, the surface over which the optical mouse is moved is a highly reflective surface created over a poplar wood board. The wood board has annular rings that are brown in color with a yellowish color in between. Thus the image sensor sees variation in the red and green light intensity since it is red and green light that produces yellow and blue is not a component of the colors of the poplar board.

Figure 18:
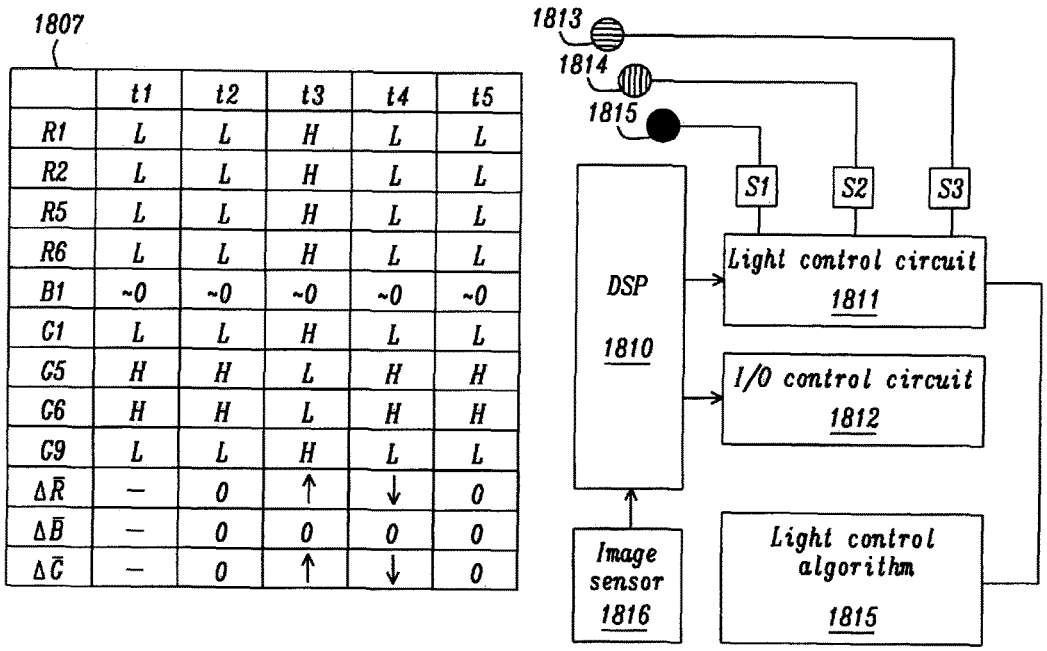
FIG. 18 shows the method and controlling circuitry and the illumination condition of multiple color light sources of the present disclosure.

FIG. 18 shows a light control circuit 1811 of the present disclosure. The light control circuit 1811 controls the intensity of each light source in accordance with an input from the digital signal processor 1810, where the digital signal processor receives data from image sensor 1816. An exemplary controlling method is shown in the light control algorithm 1815. Note that there are cases in the commercial market that the DSP 1810, the light control circuit 1811, the I/O control circuitry 1812, and the image sensor 1816 are merged as a single chip. There are also other applications that modify these functional blocks partly, but the essential purpose is the same, adjusting lighting condition based on colorimetry.

In FIG. 18, a table of data 1807 sampled from the color image sensor is shown. Each column represents a series of data monitored by the DSP (digital signal processor) 1810 for illumination control in a period of image capturing over the time period t1 through t5, as shown in FIG. 15. This is an exemplary table where the disclosed device faces a situation similar to that of FIG. 15. Thus, at t3, when the mouse sees the brown stripes of annular ring, the red pixels R1, R2, R5, and R6, get high signal. At this time, green pixels G1, G5, G6 and G9, have the respective signal output as H, L, L and H where H=High, close to Maximum; L=Low, close to Minimum. When time slips to t4, the mouse has moved to a new position which is full of yellowish structure, the red pixels change their level to L, L, and L; whereas those of the green ones change to L, H, H and L, respectively. The blue pixels don't change their pixel signal levels between time t3 and t4 because there is little or no blue content in the poplar wood that makes the table top and the blue levels are always close to Minimum. The light control circuit 1811 can check the variation of the red, blue, and green signals in a timely manner. To assure the result is useful to multiple images, the DSP 1810 monitors the signal level of multiple red pixels instead of one red pixel, and it also monitors the blue pixels and green pixels in the same fashion. Therefore, table 1807 contains the variation of light intensity acquired from subimages at t1 through t5. In this embodiment, an exemplary algorithm 1815 (detailed below) is used by the mouse of the present disclosure to check the variation of signal levels for red, blue, and green light at a time set by the optical mouse.

Algorithm if $(\Delta t > t_{lcp}) \times [(|\Delta \overline{R}| > 0) + (|\Delta \overline{G}| > 0) + (|\Delta \overline{B}| > 0)] \rightarrow$ color_change_enabled Color_change_enabled If$(\Delta \overline{R} = 0) \times (\Delta \overline{B} \neq 0) \times (\Delta \overline{G} \neq 0)$ then [Red_light→ Red_light ——]

If$(\Delta \overline{B} = 0) \times (\Delta \overline{R} \neq 0) \times (\Delta \overline{G} \neq 0)$ then [Blue_light→ Blue_light ——]

If$(\Delta \overline{G} = 0) \times (\Delta \overline{B} \neq 0) \times (\Delta \overline{R} \neq 0)$ then [Green_light→ Green_light ——]

Return end_if

Where:
$|\Delta \overline{R}|$: The absolute value of the change of the intensity of red light.
$|\Delta \overline{G}|$: The absolute value of the change of the intensity of green light
$|\Delta \overline{B}|$: The absolute value of the change of the intensity of blue light
$\Delta t$: time elapsed since last color comparing process ended
$t_{lcp}$: time interval between two color adjusting processes
color_change_enabled: entering a procedure called Color_change_enabled x: Logic AND
+: Logic OR
( ): Process in parentheses takes higher priority (to get result) than the X and +do Red_light→Red_light—: Red light dimmed by one unit (e.g. mW); associated parameters (i.e. current, voltage, etc.) are stored as the parameter Red_light Blue_light→Blue_light—: Blue light dimmed by one unit (e.g. mW); associated parameters (i.e. current, voltage, etc.) are stored in the parameter Blue_light Green_light→Green_light—: Green light dimmed by one unit (e.g. mW); associated parameters (i.e. current, voltage, etc.) are stored in the parameter Green_light The symbol "--" can be changed to "++" in different algorithm to increase the intensity of the light.

Figure 19:
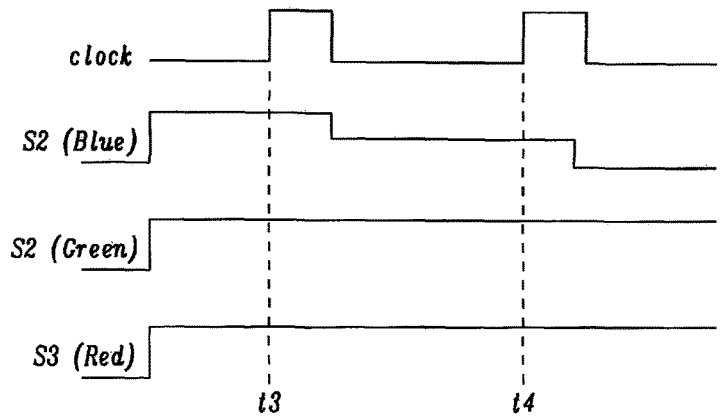
FIG. 19 shows the switching condition for the light sources of the present disclosure.

Before or after the evaluation for variation of signal levels, the illumination condition is fixed. For example, if at the moment of evaluation, the disclosed mouse finds out that one of the signals does not change, for example the signals of blue pixels, or □B=0; where □B denotes the variation of blue signal, then the control circuit 1811 will dim the blue light gradually. This is done by the switches S1, S2, and S3, whose action in the time interval between t1 and t5 is depicted in FIG. 19. As FIG. 19 shows, the switch S1 for blue light, gradually closes, by moving from H to L in steps, when time slips from t3 to t4. But the other two switches do not change their respective signal values. This algorithm is very sure that when it changes the illuminating condition for one color light source i.e. blue light, the result for the other two kinds of pixels, red and green, do not change. (or change by a negligible amount when the CFA of primary colors have overlapping spectra, which is attributed to its knowledge in basic optical physics. It is very important to know that, according to basic physics of light, R+G+B=W, and for achieving the best result for the optical mouse of the present disclosure, the white image is not desired because in such situation it only raises signal level for all pixels. Thus, the disclosed optical mouse seeks a means to adjust at least one color of light to its lowest possible signal level. The algorithm 1815 is designed for such a purpose. Of course, when the image is not as clear, the disclosed optical mouse may increase the intensity of light, just like most other approaches do. What differentiates the present disclosure from the existing state of the art is that, determined by the knowledge in colorimetry, the intensity of all light sources is not increased concurrently, which has not previously been disclosed.

Embodiment 4

This embodiment demonstrates a microelectronic device whose functionality resembles the essential concept of embodiment 3, which adjusts the energy density impinged on the photodiodes for motion detection use. What differentiates embodiment 4 from embodiment 3 is that in addition to dimming one light, or enhancing the other, embodiment 4 adjusts by enhancing or reducing the sensitivity of the respective photodiodes (red, green, and blue) to enhance the dynamic range.

Today most of the digital image sensors are designed in a way where all photodiodes in a same pixel array are storing charges in a same time interval. thus, their dynamic range is not adjustable. This embodiment uses different time intervals that vary for each individual photodiode; it allows each pixel to adjust its dynamic range based on the illumination condition.

Figure 20:
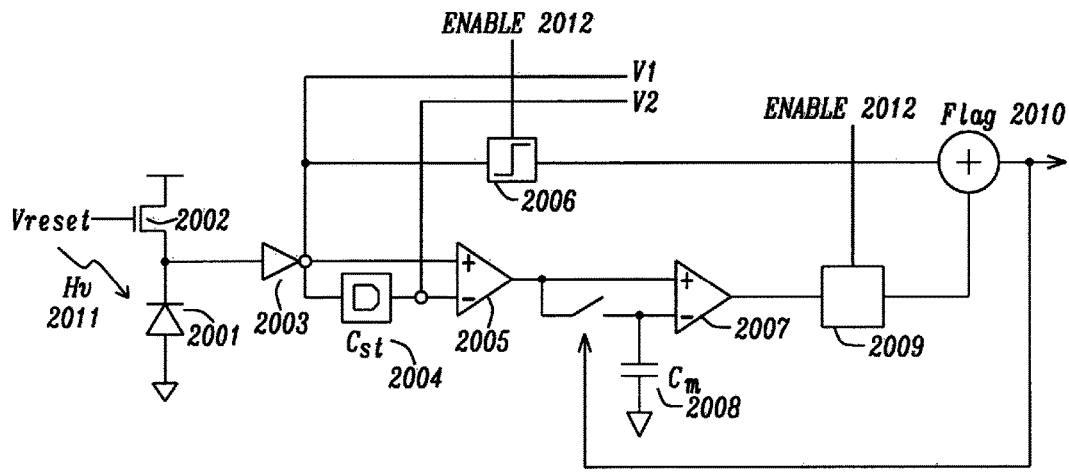
FIG. 20 shows a circuit diagram of a photodiode of a pixel that is capable of controlling dynamic range and resolution on individual pixel base.

Referring to FIG. 20, this is an exemplary case where the photodiodes and image processing circuitry are placed in a single chip. There is a photodiode 2001 that collects the charges generated by a photo-generation effect. As the influx of light energy hv 2011 continues impinging photons on photodiode 2001, a steady rate of charge is taken out of photodiode 2001. The charge then passes through inverter 2003 to generate an output signal with a specific voltage span. This output signal then reaches the delay circuitry 2004, and is temporarily stored as voltage V2 at the embedded capacitor $C_{st}$. Delay circuitry 2004 bears an timing interval, which can be designed by a counter, that will disconnect capacitor $C_{st}$ from photodiode 2001 when the delay time meets a specific value. When the delay circuitry is opened, disconnected, the charges in the inverter 2003 will be directed to the second input node (denoted by the plus sign) of the differential amplifier 2005, to establish a voltage value V1 thereon. Through the differential amplifier 2005, the two signals V1 and V2 are compared, and the result is passed to the second differential amplifier 2007 as the representative of the illumination condition experienced by the photodiode 2001. According to CFA allocation, the photodiode 2001 will be receptive to only one primary color, red, green, or blue. After the comparison result is stored in capacitor Cm 2008, the system may proceed with the image capturing process throughout the entire photodiode array, a first image frame is formed. Repeating the same process as stated above, the second image frame is formed. When the second image frame is captured, the charge stored in Cm is compared to the respective pixel data in the first image frame, where the result denotes the variation of illumination. When the variation of illumination condition exceeds a predetermined value, comparator 2009, when enabled 2012, sends out a flag signal 2010. The flag signal 2010 will be referred by the disclosed mouse system as a sign of motion of the targeted object, and it will also be used by light control circuitry to adjust the lighting condition. In the mean time, the saturation detection circuitry 2006, when enabled 2012, monitors the output signal level of photodiode 2001. If the signal level of photodiode 2001 has not reached the saturation level, or the difference of illumination condition between consecutive image frames is still negligible, the reset switch 2002 will not turn on, which allows the charge collection process of photodiode 2001 to continue without interruption. By capturing images throughout an extended period of time as a result of no interruption caused by fixed time interval signals, photodiode 2001 enhances its sensitivity, dynamic range, and resolution.

As FIG. 21 shows, which is attributed to color physics, the disclosed device is able to adjust the illumination condition of multiple light sources and the sensitivity of photodiode concurrently. Specifically, this is accomplished by the work of the light control circuit work based on signal V1, V2, (FIG. 20) and the flag signal 2010. It should be noted that the image quality of the combined image frame of all primary colors is not a critical concern to this embodiment. For motion detection use, it is sufficient to have a few pixels with high dynamic range, resolution, and sensitivity while the quality of image does not necessarily please the perception of the human eye.

While the invention has been particularly shown and described with reference to preferred embodiments thereof, it will be understood by those skilled in the art that various changes in form and details may be made without departing from the spirit and scope of the invention.

What is claimed is:

1. A device for monitoring motion, comprising:
   a) an optoelectronic sensor;
   b) a plurality of lights, configured for simultaneous emission, wherein each of said plurality of lights is configured to emit a light beam of adjustable power output in a wavelength, a band of wavelengths or a color different from that of another of said plurality of lights; and
   c) a lighting control circuit configured to receive output from said optoelectronic sensor and, as a result thereof, independently adjusting each said light beam power output; wherein
   said optoelectronic sensor is an array formed of a plurality of pixels, wherein each pixel of said plurality of pixels is made sensitive to a different wavelength emitted by said plurality of lights and reflected by a target on a surface illuminated by said plurality of lights, by placement over said plurality of pixels of a filter array configured to selectively pass only designated light wavelengths to said pixels or by manipulating a doping profile of each of said plurality of pixels or by engineering the band-gap structure of each of said plurality of pixels or by optimizing the array geometry for sensitivity to selected wavelengths; and wherein
   said device evaluates a variation in a signal derived from different colored or wavelength-band sub-images produced simultaneously by said plurality of pixels, when a power output from at least one of said plurality of simultaneously emitted light beams is independently adjusted by said lighting control circuit; and wherein
   a relative movement between said device and said surface being simultaneously illuminated by said plurality of lights is determined by evaluation of variations of signals from said pixels, wherein said variations are produced by the combined effects of said surface and said target on said surface on said adjusted combinations of individual wavelengths, bands of wavelengths or colors of said light that are reflected from the surface and impinge on said pixels.

2. The device of claim 1, wherein said relative movement is used to produce a cursor maneuvering device.

3. The device of claim 2, wherein said cursor maneuvering device is an optical computer mouse.

4. The device of claim 1, wherein said optoelectronic sensor is an image sensor.

5. The device of claim 1, wherein said movement is detected as variations of different colored sub-images of microscopic shadows formed from perturbations on the spectral reflectance to light, surface morphology, or dust like particles on a surface over which said optical electronic device is being moved.

6. The device of claim 5, wherein said variations of microscopic shadows are determined by signals from the pixels of said shadows and an area surrounding the shadows.

7. The device of claim 1, wherein said movement is detected by variations in reflected light from a surface comprising color variation.

8. The device of claim 1, wherein said pixels are adjusted for sensitivity to the plurality of lights to enhance a dynamic range of light being detected by said optoelectronic device.

9. The device of claim 1, wherein said optoelectronic sensor is matched to the wavelengths of the plurality of lights.

10. The device of claim 1, wherein said plurality of pixels and said plurality of lights are matched to an RBG (red, blue and green) color model.

11. The device of claim 1, wherein said plurality of pixels is matched to a color model of CYM (cyan, yellow and magenta), or any other cohesive color scheme that spans a color gamut.

12. A motion detection device, comprising:
   a) an image detector configured to detect a variable wavelength optical power spectrum and to dissect said spectrum into a group of sub-images, each characterized by a single color or wavelength spectrum;
   b) a plurality of variable intensity light sources each having a spectrum of pre-defined wavelengths or each being characterized by a single color wherein each light source is configured to illuminate a targeted object simultaneously with the illumination of said targeted object by each other of said light sources in said plurality;
   c) an image processing system coupled to said image detector within said device and configured to determine motion of said targeted object by separately tracking each of said group of sub-images characterized by a single color or wavelength spectrum emitted by or reflected from said simultaneously illuminated targeted object and detected by said image detector; wherein, when there is
   a movement of the device with respect to a surface on which said targeted object lies, wherein said surface is simultaneously illuminated by said plurality of light sources, then
   a series of sub-images each characterized by a single color or wavelength spectrum is captured during said movement, wherein said targeted object is within each of said series of sub-images and is tracked by each sub-image within said series of sub-images in which each said sub-image is formed from a combination of the colors of light of various intensities incident on and reflected by said targeted object from said plurality of light sources at a spatial distance from said light sources and the optical effects produced by said surface and said targeted object on the colors or wavelength spectrum of said incident light.

13. The device of claim 12, wherein each said single color, characterizing said group of sub-images or said plurality of variable intensity light sources, is a primary color.

14. The device of claim 12, wherein said single colors, characterizing said group of sub-images or said plurality of variable intensity light sources, are RGB (red, green and blue), or CYM (cyan, yellow and magenta), or any combination of color that forms a color gamut.

15. A method of motion detection, comprising:
   a) providing an optical electronic device comprising an optoelectronic sensor formed of a plurality of photo-detecting units, each sensitive to a different color or wavelength spectrum of light, and a plurality of variable intensity light sources, each characterized by a spectrum of various wavelengths or characterized by individual colors to which said sensor is sensitive, wherein said light sources are configured to simultaneously illuminate an object on a surface over which said device is moving, wherein said optoelectronic device further includes a control circuit configured to analyze data provided by said optoelectronic sensor and to use said data to control said intensities of said light sources with which said object is simultaneously illuminated;
   b) capturing, with said optoelectronic sensor, a plurality of sequentially separate images of said object, wherein each said image is formed simultaneously of subimages, each characterized by sub-images of individual colors, created by reflections or re-emissions of said simultaneously illuminating light sources from said object during relative movement between said device and said object; and c) determining said relative movement of said object by using said control circuit to adjust intensities of said light sources and analyzing effects of said adjustments on subsequent sub-images of said object.

16. The method of claim 15, wherein said device is a computer mouse.

17. The method of claim 15, wherein said plurality of light sources each emit light in a primary color.

18. The method of claim 15, wherein said optoelectronic sensor is sensitive to primary colors.

19. The method of claim 15, wherein intensity of at least one of the plurality of light sources is adjusted by said control circuit.

* * * * *

UNITED STATES PATENT AND TRADEMARK OFFICE
CERTIFICATE OF CORRECTION

PATENT NO. : 10,120,460 B2  
APPLICATION NO. : 13/834085  
DATED : November 6, 2018  
INVENTOR(S) : Wen-Chieh Geoffrey Lee Page 1 of 1

It is certified that error appears in the above-identified patent and that said Letters Patent is hereby corrected as shown below:

In the Specification

In Column 9, Line 57 delete "□ is the wavelength of the color light;" and replace with -- "λ is the wavelength of the color light; --.

In Column 9, Lines 58, 59 delete ", , are the sensitivities of the image sensor at a specific wavelength □□" and replace with -- , , are the sensitivities of the image sensor at a specific wavelength λ --.

In Column 14, Lines 17 through 22 delete "The light from each light source is separated by angles □, □, □ and on the targeted object surface plane 1403, where each angle is approximately □□□□. The angle of inclination of the light from the three light sources is approximately □□□□□□□..... Thus □□ the light sources are preferred to be positioned at a lateral distance of approximately a few mm away from ..." and replace with -- "The light from each light source is separated by angles α, β, and γ on the targeted object surface plane 1403, where each angle is approximately 120°. The angle of inclination of the light from the three light sources is approximately θ1=θ2=θ3=45°. Thus, the light sources are preferred to be positioned at a lateral distance of approximately a few mm away from ... --.

Signed and Sealed this  
Third Day of September, 2019

Andrei Iancu  
*Director of the United States Patent and Trademark Office*